US009264303B2

(12) United States Patent
Madaiah et al.

(10) Patent No.: US 9,264,303 B2
(45) Date of Patent: Feb. 16, 2016

(54) PROTECTION SWITCHING METHOD AND SYSTEM PROVISION BY A DISTRIBUTED PROTECTION GROUP

(75) Inventors: Vinod Kumar Madaiah, Bangalore (IN); Somnath Ojha, Mumbai (IN)

(73) Assignee: Tejas Networks Limited, Bangalore (IN)

( * ) Notice: Subject to any disclaimer, the term of this patent is extended or adjusted under 35 U.S.C. 154(b) by 116 days.

(21) Appl. No.: 14/004,278

(22) PCT Filed: Aug. 11, 2011

(86) PCT No.: PCT/IN2011/000540
§ 371 (c)(1),
(2), (4) Date: Feb. 4, 2014

(87) PCT Pub. No.: WO2012/123954
PCT Pub. Date: Sep. 20, 2012

(65) Prior Publication Data
US 2014/0177432 A1    Jun. 26, 2014

(30) Foreign Application Priority Data
Mar. 11, 2011 (IN) .............................. 727/CHE/2011

(51) Int. Cl.
*H04L 12/26* (2006.01)
*H04L 12/24* (2006.01)
*H04L 1/00* (2006.01)

(52) U.S. Cl.
CPC .......... *H04L 41/0668* (2013.01); *H04L 1/0061* (2013.01); *H04L 41/0659* (2013.01); *H04L 2001/0097* (2013.01)

(58) Field of Classification Search
None
See application file for complete search history.

(56) References Cited

U.S. PATENT DOCUMENTS

| | | | |
|---|---|---|---|
| 6,467,065 B1 * | 10/2002 | Mendez et al. .... | G05B 19/0421 710/31 |
| 2003/0043736 A1 | 3/2003 | Gonda | |
| 2004/0042416 A1 | 3/2004 | Ngo et al. | |
| 2004/0044754 A1 | 3/2004 | Virdy et al. | |
| 2005/0080933 A1 * | 4/2005 | Herring ......................... | 709/249 |
| 2005/0180339 A1 | 8/2005 | Guess et al. | |
| 2007/0008982 A1 | 1/2007 | Voit et al. | |
| 2008/0267072 A1 | 10/2008 | Sultan et al. | |
| 2010/0177630 A1 * | 7/2010 | He et al. ......................... | 370/217 |

* cited by examiner

*Primary Examiner* — Michael J Moore, Jr.
(74) *Attorney, Agent, or Firm* — Woodard, Emhardt, Moriarty, McNett & Henry LLP

(57) ABSTRACT

The present invention relates to a protection switching for use in a communication network, and more particularly, to a method and a system for protection switching provision by a distributed or extended protection group in a communication network. In one embodiment, this can be accomplished by defining a traffic bit (t-bit) on all the communication devices in the network, assigning at least one communication device as master node and other devices as slave node, determining a fault if continuity check message is not received in a predetermined time period between the master node and the traffic source, carrying of status information, reliably, between communication devices using existing protection or restoration methods, broadcasting by setting the bit 't'=1 (or 't'=0) by the master node to all other slave nodes thereby notifying about the fault (or clearance of fault) towards traffic source and receiving the traffic from the traffic source by the other available slave nodes when master node's link towards traffic source fails.

12 Claims, 5 Drawing Sheets

PROTECTION SWITCHING METHOD AND SYSTEM PROVISION BY A DISTRIBUTED PROTECTION GROUP

FIELD OF THE INVENTION

The present invention relates to a protection switching for use in a communication network, and more particularly, to a method and a system for protection switching provision by a distributed or extended protection group in a communication network.

BACKGROUND OF THE INVENTION

Communication networks are becoming widely used for distributing both high and low speed data over varying distances. Typically, a communication network is comprised of a number of network elements (for example Nodes, switches, routers etc) that are connected to each other in a variety of configurations so as to form a unified communication network. The communication network may extend over a small area, such as a company wide network, or may cover large distances, such as in regional or nationwide networks. The nodes allow network clients to input data for transmission over the network and to receive data transmitted over the network from other locations. Thus, data may be added to, or dropped from the network at node locations, as the data flows from point to point throughout the network.

One problem associated with communication networks is the problem of protection switching. In one situation, protection switching involves the process of switching network traffic from one network transmission path to another in the event of a network failure.

In another protection switching technique, typically used in ring networks, the network traffic is transmitted over working and protection transmission paths that flow in different directions over the network to the same destination. In the event of a network failure, either the working or protection transmission path will be selected to deliver the network traffic to the network element at the final destination. To ensure uninterrupted (continuous) traffic flow a protection group (PG) is provisioned at each node where at least one working and at least one protection elements are presented at every node. FIG. 1 shows an example illustration of the protection group (PG) as defined in Provide Bridge Backbone Network with Traffic Engineering (PBB-TE, i.e. IEEE 802.1Qay) which has one work and one protect. Also, IEEE 802.1Qay defines two PGs are must i.e. one on source end and other on the destination end. Also, the work (protect) entity is bi-directional and path should be congruent between the two PGs.

Therefore, it would be desirable to have a system to perform protection switching in a communication network using distributed or extended protection group to overcome the above restrictions.

SUMMARY OF THE INVENTION

An aspect of the present invention is to address at least the above-mentioned problems and/or disadvantages and to provide at least the advantages described below.

Accordingly, an aspect of the present invention is to provide a protection switching method in a communication network, the communication network including a plurality of communication devices connected logically to receive traffic from at least one traffic source, the method comprising: defining a traffic bit (t-bit) on all the communication devices in the network, assigning at least one communication device as master node and other devices as slave node, determining a fault if continuity check message is not received in a predetermined time period between the master node and the traffic source, carrying of status information, reliably, between communication devices using existing protection or restoration methods, broadcasting by setting the bit 't'=1 (or 't'=0) by the master node to all other slave nodes thereby notifying about the fault (or clearance of fault) towards traffic source and receiving the traffic from the traffic source by the other available slave nodes when master node's link towards traffic source fails.

In another aspect of the present invention is to provide a protection switching system in a communication network, the system comprising: at least one traffic source and a plurality of communication device which are connected logically to receive traffic on at least one port, wherein at least one communication device assigned as a master node and other as slave nodes, wherein the master node and the slave nodes are configured to defining a traffic bit (t-bit) on all the communication devices in the network, assigning at least one communication device as master node and other devices as slave node, determining a fault if continuity check message is not received in a predetermined time period between the master node and the traffic source, carrying of status information, reliably, between communication devices using existing protection or restoration methods, broadcasting by setting the bit 't'=1 (or 't'0) by the master node to all other slave nodes thereby notifying about the fault (or clearance of fault) towards traffic source, receiving the traffic from the traffic source by the other available slave nodes when master node's link towards traffic source fails and blocking of the traffic from the traffic source by the other available slave nodes when the master node's link towards traffic source recovers from fault.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Figure 1:
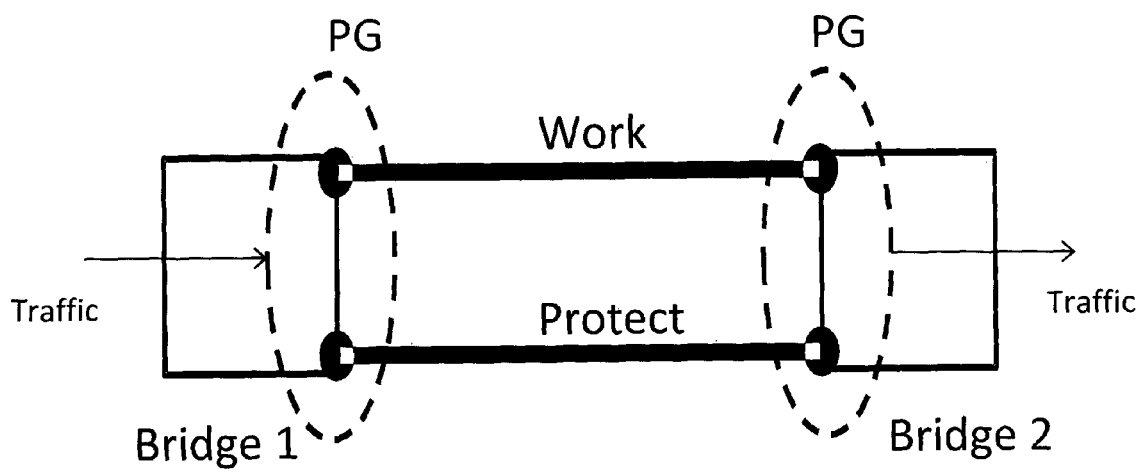
FIG. 1 shows an example of a protection group (PG) as defined in Provider Backbone Bridged Network with Traffic Engineering (PBB-TE, i.e. IEEE 802.1Qay).

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

DETAIL DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 2 through 5, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 2:
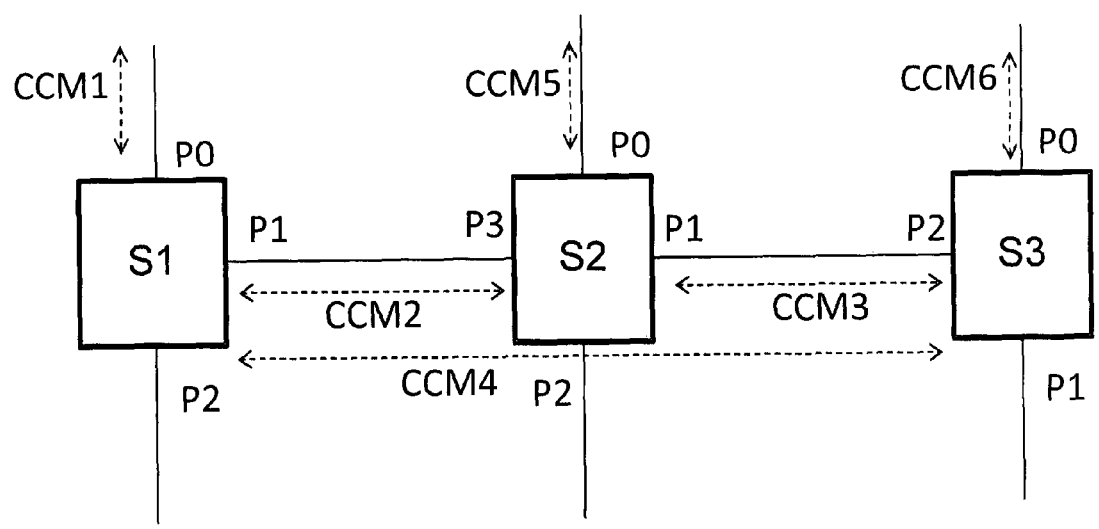
FIG. 2 shows example topology of a communication system.

FIG. 2 shows example topology of a communication. FIG. 1 illustrates a system including one or more switches S1, S2 and S3 which are connected logically as shown in the figure. All the switches include ports P0, P1, P2, P3 etc. The switches are connected to a traffic source (not shown in figure) that pumps traffic on all P0 ports of the switches. All the nodes are exchanging continuity check message (CCM1, CCM2, CCM3, CCM4, CCM5, CCM6 etc.) in order to check whether the link are intact or not. All switches receive traffic from the traffic source at port P0 and pass on the traffic to other network switches or nodes through the other ports.

Figure 3:
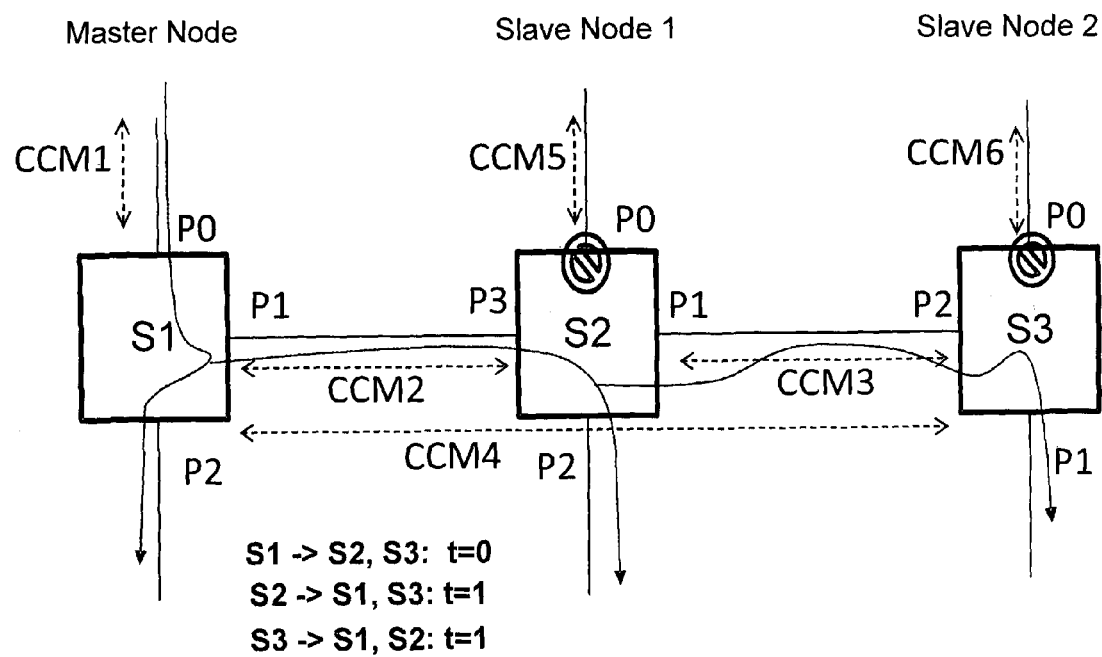
FIG. 3 shows example topology of a communication system as shown in FIG. 1, where distributed protection group may be implemented in accordance with one embodiment of the invention.

FIG. 3 shows example topology of a communication system as shown in FIG. 1, where distributed protection group may be implemented in accordance with one embodiment of the invention. As shown in FIG. 2, one or more switches S1, S2 and S3 which are connected logically. All the switches include ports P0, P1, P2, P3 etc. The switches are connected to a traffic source (not shown in figure) that pumps traffic on all P0 ports of the switches. All the nodes are exchanging continuity check message (CCM1, CCM2, CCM3, CCM4, CCM5, CCM6 etc.) in order to check the link integrity. All switches receive traffic from the traffic source at port P0 and pass on the traffic to other network switches or nodes through the other ports.

The CCM1 to CCM6 uses one unique VLAD ID per traffic. All CCMs are either pre-provisioned on all participating devices or provisioned only on the end nodes while using resiliency technology between the end nodes. CCM1 to CCM6 could be P2P or P2MP CCM or others. In the present example embodiment, all CCM are P2P CCM.

In an example operation, defining traffic bit on all the communication devices (i.e. all switches S1, S2 and S3) in the network, where the traffic bit educate or route the direction of the flow of traffic from the traffic source to the communication devices. The 't' bit is the traffic bit which is defined in IEEE 802.1Qay or any other bit can also be used to offer the same function. The function of 't' bit in the standard IEEE 802.1Qay is to check whether the traffic is present or not present in the entity. Entity could be work or protect as in 802.1 Qay i.e. 't'-bit=0 means traffic is not present on the entity and bit 't'=1 means traffic is present on the entity.

To implement in the current system, the way of 't-bit' is used and interpreted is different in a distributed protection group. In the FIG. 2, the fault has occurred in the link between switch S1 and the traffic source i.e. between port P0 and traffic source. The fault is confirmed, if there is a discontinuity in receiving the CCM within a predetermined time period. In this example scenario, the distributed protection group works by defining a traffic bit i.e. t-bit on all the communication devices in the network, wherein the traffic bit educate the direction of the flow of traffic from the traffic source to the communication device. At the initial state before the fault has occurred, S1 is allowed to receive traffic from the traffic source where other switches S2 and S3 has put block on the receiving ports i.e. P0 in the network. Due to this, switch S1 consider as a master node and other devices as slave node, wherein the master node is configured to set as bit 't'=0 and other slave nodes is configured to set as bit 't'=1. The fault is confirmed only when continuity check message is not received in a predetermined time period between the master node and the traffic source. The master node S1 set the bit 't=1' and broadcast the same to other slave nodes i.e. S2 and S3 thereby notifying that S1 is expecting of receiving traffic from the other nodes. As soon as the slave nodes receives bit 't=1' from the master node, the slave nodes are triggered to unblock the port towards the traffic source. Further, the slave nodes check for the priority between the other slave nodes, to which node i.e. S2 or S3 will be unblocking the blocked port P0 to receive traffic.

Considering master node has blocked his port P0 after time $T_0$, and sets 't-bit' equal to 1. Switch S2 and S3 receives set 't'-bit=1. Switch S3 will wait for a specified duration, $T_2 > T_0$, for receipt of 't'=1 from S2 before unblocking port P0; if S3 does not wait then the north ports on both S2 and S3 i.e. port P0 will open which leads to ambiguity in the network. So, as soon as t-bit=1 received by the S2 from S1, S2 will unblock its north-port after waiting for specified duration, T1, $T_0 < T_1 < T_2$. The time setting in the network is preferably $T_1 > 3 \times T_0$, $T_2 > 3 \times T_1$ and so on or any other calculation is also possible based on the configuration.

The final state of protection network will be S2 will be sending the t-bit=0 to S1 and S3, Switch S1 will be sending the t-bit=1 to S2 and S3 and switch S3 will be sending t-bit=1 to S1 and S2.

Alternatively, in the process of restoration the following step may be implemented in a distributed or extended protection group. Initial state i.e. when the fault has already noted and the present setting at the Switches presented are as i.e. at S2→S1, S3:'t'=0; at S1→S2, S3:'t'=1 and at S3→S1, S2:'t'=1. If fault recovers on P0 of S1, then S1 waits for $T_0$ and then send S1→S2, S3: 't'=0; S2 blocks its port P0 after time $T_1$ and switch S2→>S1, S3: 't'=1. Switch S1 unblocks its P0 after waiting for additional $T_2-T_0$ (it has already waited for $T_0$). Once the restoration has done, the final state at all the switches will be S1→S2, S3:'t'=0, S2→S1, S3:'t'=1, S3→S1, S2:'t'=1.

Figure 4:
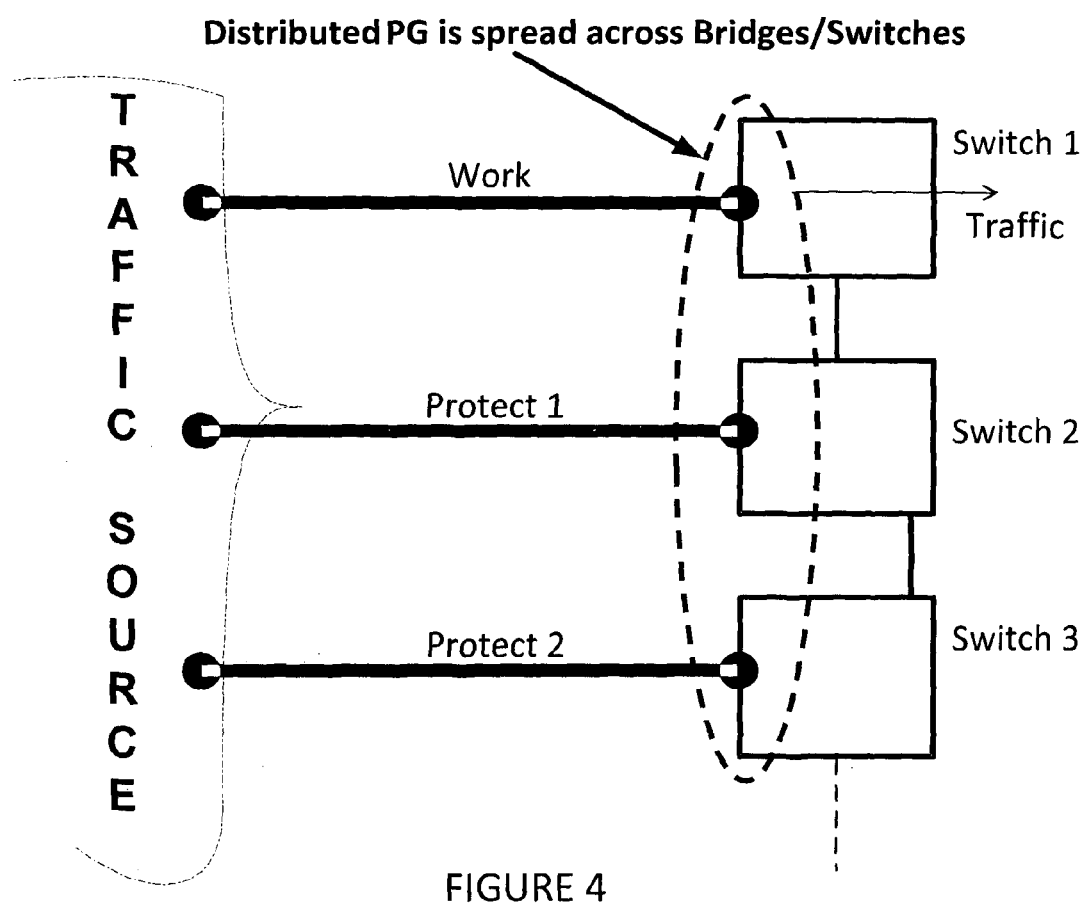
FIG. 4 shows an example representation of distributed protection group spread over the switches/bridges

FIG. 4 shows an example representation of distributed protection group spread over the switches/bridges. The switch S1 is the master node (work segment) and switches S2 and S3 are the slave nodes (protect segments i.e. protect 1 and protect 2). The distributed protection group runs on these three switches S1, S2 and S3 (as shown in figure).

Figure 5:
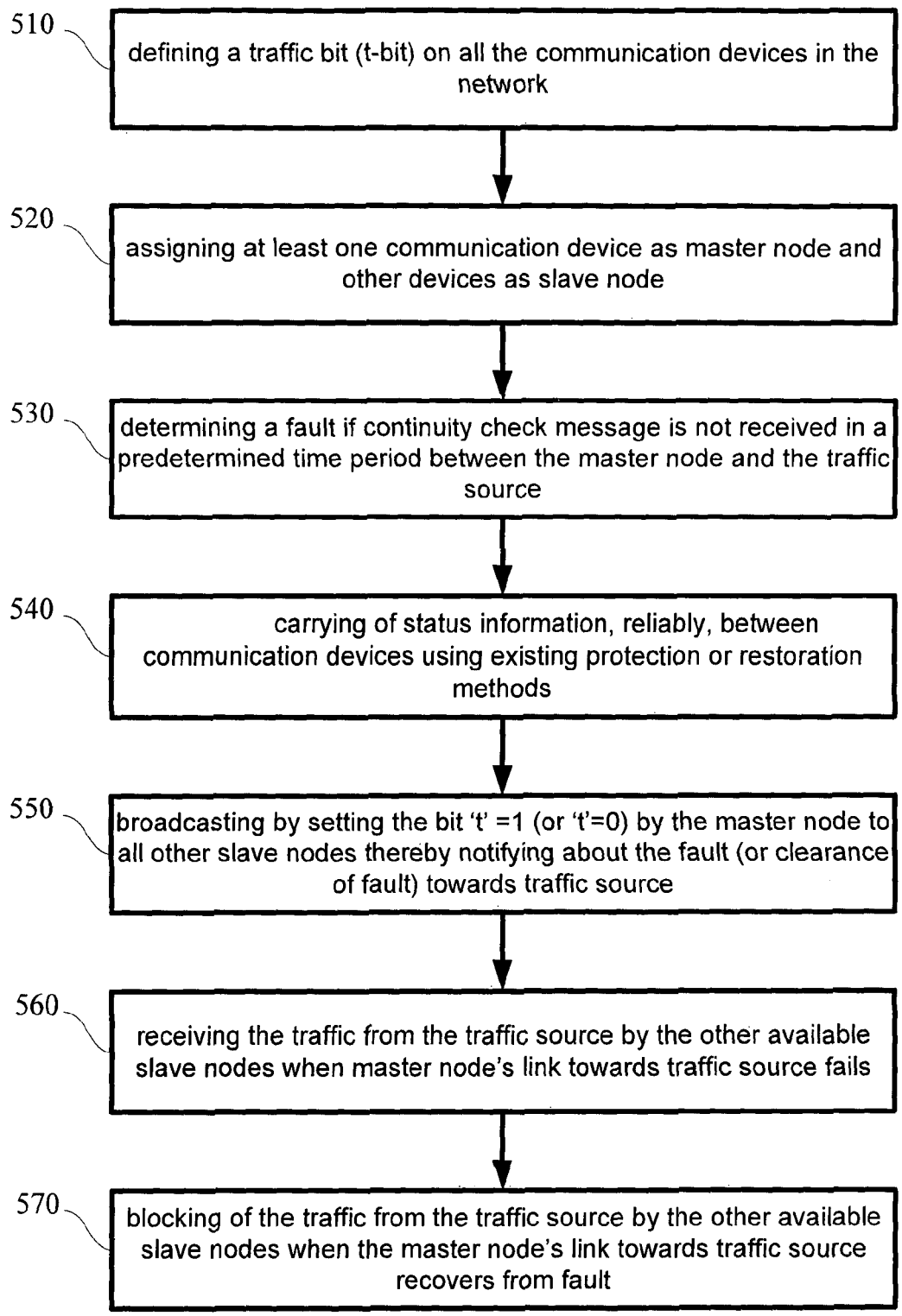
FIG. 5 shows flow chart of a protection switching method using distributed protection group mechanism in accordance with one embodiment of the invention.

FIG. 5 shows flow chart of a protection switching method using distributed protection group mechanism in accordance with one embodiment of the invention.

At step 510 the method defines traffic bit on all the communication devices in the network, where the traffic bit towards traffic source educate the status of the traffic from the traffic source to the communication device, and also the traffic bit from one communication device towards other communication devices educate status of the traffic from the traffic source.

At step 520, the method assigns at least one communication device as master node and one or more devices as slave node, where the step of assigning includes, under normal condition the master node when communicating with the traffic source is configured to set as bit 't'=1, and while communicating with slave nodes is configured to set as bit 't'=0 and other slave nodes is configured to set as bit 't'=1.

At step 530, the method determines a fault if continuity check message is not received in a predetermined time period between the master node and the traffic source.

At step 540, the method carries status information, reliably, between communication devices using existing protection or restoration methods.

At step 550, the method broadcasts the message by setting the bit 't'=1 (or 't'=0) by the master node to all other slave nodes thereby notifying about the fault (or clearance of fault) towards traffic source.

At step 560, the method receives the traffic from the traffic source by the ether available slave nodes when master node's link towards traffic source fails. In addition to this, the one or more slave nodes check for 't' bit from all other communicating nodes before unblocking the port towards the traffic source. Further, the slave nodes are prioritized to unblock the port by waiting a predetermined time interval to avoid any ambiguity in the network.

At step 570, the method blocks the traffic from the traffic source by the other available slave nodes when the master node's link towards traffic source recovers from fault. To avoid ambiguity in the network, all nodes wait for a predetermined time interval as explained in the example.

Although the method flowchart includes steps 510-570 that are arranged logically in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

FIGS. 1-5 are merely representational and are not drawn to scale. Certain portions thereof may be exaggerated, while others may be minimized. FIGS. 1-5 illustrate various embodiments of the invention that can be understood and appropriately carried out by those of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively.

We claim:

1. A protection switching method in a communication network, the communication network including a plurality of communication devices connected logically to receive traffic from at least one traffic source, the method comprising:

defining a traffic bit (t-bit) as part of a common message structure used between all the communication devices in the network;

assigning at least one communication device as a master node and other devices as slave nodes;

determining a fault when a continuity check message is not received in a predetermined time period between the master node and the traffic source;

transmitting and receiving status information, reliably, between the master and slave nodes;

notifying the slave nodes about a fault (or clearance of fault) between the traffic source and the master node, wherein the master node broadcasts the status information with traffic bit=1 (or 't'=0) from the master node to all other slave nodes; and receiving the traffic from the traffic source by the other available slave nodes when the master node's link towards traffic source fails.

2. The protection switching method of claim 1, further comprising:

blocking of the traffic from the traffic source by the other available slave nodes when the master node's link towards the traffic source recovers from the fault.

3. The protection switching method of claim 1, wherein the traffic bit towards the traffic source educates the status of the traffic from the traffic source to the communication device, and wherein the traffic bit from one communication device towards other communication devices educates the status of the traffic from the traffic source.

4. The protection switching method of claim 1, wherein the step of assigning includes, under normal conditions, the master node, when communicating with the traffic source, is configured to set bit 't'=1, and while communicating with slave nodes, is configured to set bit 't'=0 and other slave nodes are configured to set bit 't'=1.

5. The protection switching method of claim 1, wherein the message structure between the communication devices defines traffic bit t=0 as indicating that traffic is being received by a communication device of the communication devices and bit t=1 as indicating that traffic from the traffic source is blocked by the same communication device of the communication devices.

6. The protection switching method of claim 1, further comprising:
   receiving the bit t=1 from the master node or slave node triggers at least one of the other communicating nodes to unblock a port towards the traffic source.

7. The protection switching method of claim 6, wherein the plurality of slave nodes check for the 't' bit from all other communicating nodes before blocking when the fault towards traffic source is recovered or unblocking a port towards the traffic source when a link of at least one communicating node towards the traffic source fails.

8. The protection switching method of claim 7, wherein the plurality of slave nodes are prioritized to block or unblock respective ports by waiting a predetermined time interval to avoid any ambiguity in the network, and wherein the slave nodes block under restoration and unblock under protection from fault.

9. A protection switching system in a communication network, the system comprising:
   at least one traffic source; and
   a plurality of communication devices which are connected logically to receive traffic on at least one port, wherein at least one communication device is assigned as a master node and other communication devices as slave nodes, wherein the master node and the slave nodes are configured to:
      define a traffic bit (t-bit) as part of a common message structure passed between the communication devices;
      determine a fault when a continuity check message is not received in a predetermined time period between the master node and the at least one traffic source;
      transmit and receive status information, reliably, between communication devices on the communication network;
      notify the slave nodes about a fault (or clearance of fault) between the at least one traffic source and the master node, wherein the master node broadcasts status information with traffic bit 't'=1 (or =0) to all other slave nodes;
      receive the traffic from the traffic source by the available slave nodes when the link between the master node and the at least one traffic source fails; and
      block the traffic received by the available slave nodes from the at least one traffic source when the master node's link to the traffic source recovers from the fault.

10. The system of claim 9, wherein the master node and the slave node are switches, routers, etc.

11. The protection switching method of claim 1, wherein the traffic bit is defined by IEEE 802.1Qay.

12. The system of claim 9, wherein the traffic bit is defined by IEEE 802.1Qay.

* * * * *